United States Patent [19]

Anderson

[11] Patent Number: 4,733,638

[45] Date of Patent: Mar. 29, 1988

[54] AUTOMOTIVE ANTI-THEFT STARTING SYSTEM

[76] Inventor: Lyle V. Anderson, 4260 S.E. 20th Pl., Apt. #1-301, Cape Coral, Fla. 33904

[21] Appl. No.: 896,241

[22] Filed: Aug. 14, 1986

[51] Int. Cl.⁴ .................................................. B60R 25/04
[52] U.S. Cl. .................................. 123/198 B; 180/287; 340/64; 307/10 AT
[58] Field of Search .................... 123/198 B, 179 B; 180/287; 340/63, 64; 307/10 AT

[56] References Cited

U.S. PATENT DOCUMENTS

| | | | |
|---|---|---|---|
| 3,136,307 | 6/1964 | Richard | 123/198 B |
| 3,646,515 | 2/1972 | Vodehnal | 180/287 |
| 3,784,839 | 1/1974 | Weber | 180/287 |
| 3,987,408 | 10/1976 | Sassover et al. | 180/287 |
| 4,023,138 | 5/1977 | Ballin | 180/287 |
| 4,159,467 | 6/1979 | Ballin | 180/287 |
| 4,288,778 | 7/1981 | Zucker | 180/287 |
| 4,366,466 | 12/1982 | Lutz | 180/287 |
| 4,438,426 | 3/1984 | Adkins | 180/287 |
| 4,463,340 | 7/1984 | Adkins et al. | 180/287 |
| 4,545,343 | 10/1985 | Cook et al. | 123/198 B |

*Primary Examiner*—Ira S. Lazarus
*Attorney, Agent, or Firm*—Clifford A. Poff

[57] ABSTRACT

A security starting system for a motor vehicle is disclosed. The system includes a portable hand-held transmitting device carried in the passenger compartment of the vehicle; by the operator and a receiving device located in the housing of the starter in the engine compartment of the vehicle. An operator desiring to start the vehicle actuates the transmitter. When the receiver detects the transmitted signal, it produces an electrical signal which closes a switch connected in series to the motor vehicle ignition system thereby allowing the ignition switch of the ignition system to start the vehicle.

10 Claims, 3 Drawing Figures

AUTOMOTIVE ANTI-THEFT STARTING SYSTEM

BACKGROUND OF THE INVENTION

1. Field of the Invention

The invention relates generally to radio frequency actuation systems and, more specifically, to a secured ignition system for a motor vehicle.

2. Description of the Prior Art

In a conventional motor vehicle, the internal combustion engine of the vehicle is "started" by an electrical starter motor. Current to start the electrical starter motor, in turn, is supplied by a battery power source wherein the battery power source and the starter motor comprise part of the ignition system circuit of the motor vehicle.

The starter motor is contained in a housing located beneath the internal combustion engine of the motor vehicle and contains a rotatable armature. Translation of the rotatable armature causes contact with a flywheel which is connected in-line with the crankshaft of the internal combustion engine. When current is supplied to the starter motor, the armature is translated and rotated. This movement causes the flywheel to rotate, and, the crankshaft to rotate, thereby causing the internal combustion engine to "start".

Typically, a key-operated switch located on the steering column of the vehicle is connected in a series connection in the ignition system circuit containing the battery power source and the starter motor. Closing of the switch closes the ignition system circuit, allowing the starter motor to "start" the internal combustion engine. Security of the ignition system circuit is dependent upon the integrity of the key-operated switch. By shorting the key-operated switch, the ignition system circuit may be closed without the need of a key to close the switch. This is known as "hot wiring" starting.

Shorting the key-operated ignition switch is frequently the method used to "start" the internal combustion engine during theft of a motor vehicle. The switch is typically located on the steering column of the vehicle which is surrounded by a circular metal housing. By breaking open the metal housing, the switch may thereafter be quickly and easily shorted. Alternatively, the key switch may be broken by the forceful insertion of an object such as a screwdriver into the keyhole whereby the screwdriver thereafter effectively acts as a key to close the switch.

Several means have been developed which attempt to improve the integrity of the ignition system circuit to make theft of the vehicle more difficult. An encoding/decoding system is disclosed in U.S. Pat. No. 4,141,332 which prevents the starting of the engine merely by shorting the ignition key switch. An encoder housed in a secure housing located proximate to the ignition key switch is actuated by the turning of the key and the encoder then transmits a digital code through an electrical connection to a decoder located in the engine compartment. Only when the digital code received by the decoder agrees with a code stored in a memory component of the decoder is the starter allowed to start the motor. While this system provides a means of preventing theft of a vehicle by merely shorting the ignition key switch, the system suffers from a major disadvantage. The encoder and decoder must be installed as a set. If either the encoder or decoder fails, both must be replaced. The encoder is typically located on the housing of the drive shaft, or in the dashboard, and is not easily accessible. Replacement of the encoder/decoder is therefore a major undertaking.

It is therefore an object of the invention to provide a system to improve the security of a conventional unsecured ignition system.

It is a further object of the present invention to provide a security system which is both inexpensive and easily maintained.

SUMMARY OF THE PRESENT INVENTION

In accordance with the present invention, a security starting system for a motor vehicle includes a radio frequency transmitting means, a radio frequency receiving means, and a switch means. The switch means is located in a series connection in the starter housing and is inaccessible unless the complete starter is removed from the motor vehicle.

The radio frequency transmitting means is hand held by the driver—same as the key of vehicle, and, for example, may be part of a key assembly used to close the ignition key switch of the ignition system. The receiving means and switch means are securely housed in the starter assembly of the engine compartment with an antenna extending into the passenger compartment to detect a radio frequency signal transmitted by the radio frequency transmitter. Upon detection of the transmitted signal, the receiving means produces an electrical signal which causes the switch means to close, thereby allowing the normal starting system of the vehicle to start the engine.

BRIEF DESCRIPTION OF THE DRAWINGS

The invention may be better understood and further advantages and uses thereof more readily apparent when considered in view of the following detailed description of the exemplary embodiment taken with the accompanying drawings in which.

DESCRIPTION OF THE PREFERRED EMBODIMENT

Figure 1:
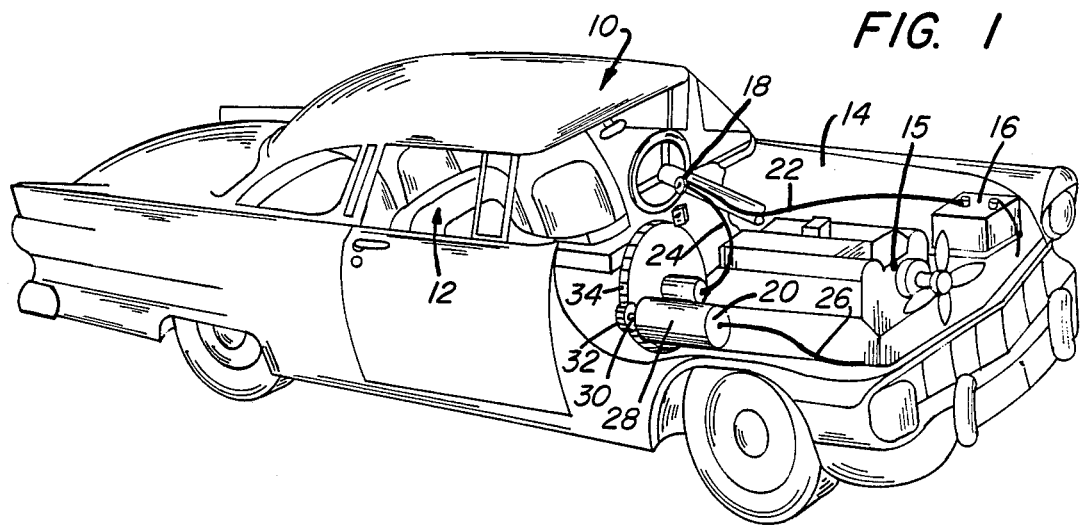
FIG. 1 is a schematic view of a motor vehicle containing the starting system of the prior art.

Referring now to FIG. 1, there is shown a conventional motor vehicle 10 containing a passenger compartment 12 and an engine compartment 14 containing an engine 15. An ignition system circuit consisting of a battery power source 16, an ignition key switch 18, and a starter mechanism 20, is connected in series by wires 22, 24 and 26. Starter mechanism 20 includes a housing 28 and an armature 30 with a pinion 32 attached to the end thereof. When the ignition system circuit is closed, a magnetic field is produced inside the starter 20 which, in turn, causes armature 30 to be translated and rotated. Translation of the armature 30 causes the pinion 32 to contact a flywheel 34. Rotation of the flywheel 34 is caused by rotation of armature 30, and, in turn, causes the engine 15 of the motor vehicle to "start".

Figure 2:
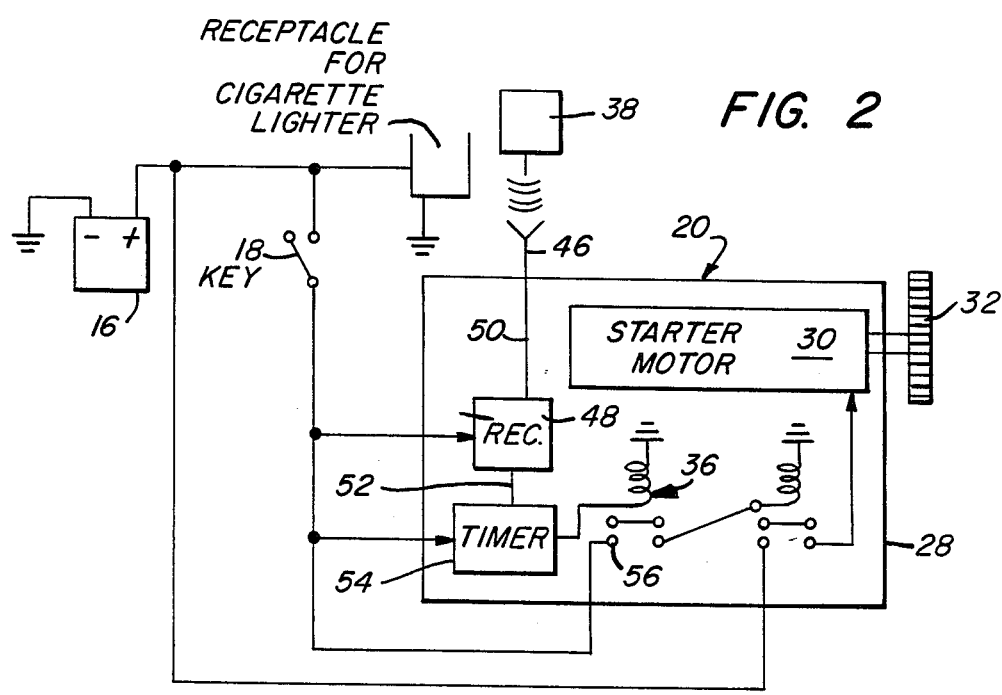
FIG. 2 is a schematic diagram of the automotive anti-theft starting system of the present invention.

As shown in the partial block diagram and partial schematic of FIG. 2, the security system of the present invention inserts an additional switch means 36 in series into the ignition system circuit. In the preferred embodiment, the switch means 36 is located inside the protective housing 28 of the starting mechanism 20. Only when switch means 36 is closed may the engine of the motor vehicle be started.

Figure 3:
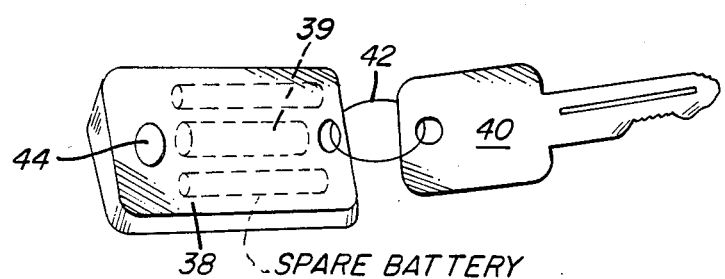
FIG. 3 is a schematic view of one embodiment of the radio frequency transmitter of the present invention disposed on a key ring assembly.

The driver enters the vehicle 10 with the portable transmitter and ignition key 40 in hand. As shown in FIG. 3, the transmitter 38 is of such dimensions that it may be located on a key chain also holding the key 40 required to close the ignition key switch 18. In the preferred embodiment, transmitter 38 is contained in a portable housing with battery power supply 39 and is attached to a key chain 42 containing the key 40. Actuation of the transmitter 38 is caused by depressing a pressure sensitive switch 44. A spare battery is also housed in the transmitter in case original battery fails. A power receptacle such as a cigarette lighter in the motor vehicle can be used to provide a source of current to operate a transmitter or to charge a rechargable battery when used in the transmitter.

Referring again to FIG. 2, antenna 46 which extends into passenger compartment 12 of motor vehicle 10 is connected to a radio frequency receiver 48 located inside the protective housing of the starter mechanism 20 by wire 50. Receiver 48 produces an electrical signal in response to times in which the antenna 46 detects a signal of a specific frequency. Wire 52 provides an electrical connection between the receiver 48 and switch means 36. Switch means 36 may include a time-delay relay 54 containing a normally open contact 56. Contact 56 is connected in series in the ignition system circuit, thereby allowing starting of the engine only when the relay 54 is energized.

In operation, the anti-theft starting system functions to prevent closing of the ignition system circuit by merely shorting the ignition key switch 18. To close the ignition circuit, not only must the ignition key switch 18 be closed, but also, the switch means 36 must be closed. Because switch means 36 is located inside the protective housing 28 of the starter mechanism 20, shorting of switch means 36 by a thief would be for all practical purposes impossible. Additionally, because there are numerous—(10,000) possible frequencies in the band at which the radio frequency transmitter 38 may transmit, closing of the switch means 36 by use of an alternate radio frequency transmitter 38 to guess at actual frequency required to close the switch means 36 would similarly be a very inconvenient and timeconsuming task.

To start the engine of the motor vehicle 10, an operator must have both the key 40 to close the ignition key 18, and the radio frequency transmitter 38 to close the switch means 36. Because transmitter 38 is portable, it may be attached to key chain 42 containing the key 40. The operator first inserts the key 40 into the ignition key switch 18. The operator then actuates the radio frequency transmitter 38 by depressing the pressure-sensitive switch 44. Actuation of the radio frequency transmitter 38 produces a signal which is detected by the antenna 46. Radio frequency receiver 48 produces an electrical signal in response to times in which the antenna detects the signal produced by the radio frequency transmitter 38. The electrical signal produced by radio frequency receiver 48 is contained on wire 52 and causes relay 54 to become energized. Normally open contact 56 of relay of 54 closes and thereby allows closing of the ignition system circuit by turning the key 40 of the ignition key switch 18. By including a time delay "off" on the relay 54, momentary actuation of radio frequency transmitter 38 causes closing of the contact 56 of switch means 36 for a specific period of time. By making the time delay two to three minutes, inconvenience is avoided in the event that the engine of the motor vehicle does not start the first time, the ignition key switch is closed.

While the present invention has been described in connection with the preferred embodiment shown in FIGS. 1-3, it is understood that other similar embodiments may be used or modifications and additions may be made to the described embodiment for performing the same functions of the present invention without deviating therefrom. For example, rather than using a radio frequency transmitter to transmit a radio frequency signal to cause closing of the switch means 36, an infrared frequency signal produced by an infrared frequency transmitter may work equally well. Still, another means that could be used to operate switch 36 would be a specific audio signal and detector. Therefore, the present invention should not be limited to any single embodiment, but rather construed in breadth and scope in accordance with the recitation of the appended claims.

I claim as my invention:

1. A security starting system for a motor vehicle having a passenger compartment with an ignition switch therein and an engine compartment with an engine including a starter motor housing for protectively enclosing a starter motor controlled by a relay as part of a starter circuit for starting the engine of the motor vehicle, said security starting system comprising:
   transmitting means operative to transmit an electromagnetic signal in response to actuation thereof;
   receiving means operative to receive said electromagnetic signal transmitted by the transmitting means and to produce an electrical signal during times in which the receiving means receives the electromagnetic signal; and
   including a timer in said starter motor housing and an antenna connected to said receiving means in said starter motor housing and extending remotely to said starter motor housing for delivering the electromagnetic signal transmitted by said transmitting means; and
   switch means responsive to said electrical signal for controlling a period of time when said relay may be energized for operating said starter motor to start the engine of the motor vehicle by closing of the ignition switch.

2. The starting system of claim 1 wherein the transmitting means comprises a driver hand-held transmitter.

3. The starting system of claim 2 wherein the transmitting means includes a radio frequency transmitter, a power supply and a portable housing, said transmitter and said power supply being located within said portable housing.

4. The starting system of claim 3 wherein the radio frequency transmitting means is removably located proximate to the ignition switch.

5. The starting system according to claim 1 wherein said transmitting means comprises an infrared transmitter.

6. The starting system according to claim 1 wherein said transmitting means comprises an audio transmitter.

7. The starting system of claim 1 wherein the antenna extends into the passenger compartment of the motor vehicle.

8. The starting system of claim 1 wherein the switch means includes a relay and a normally open contact responsive thereto, with said relay being reset a certain period of time after responding to the electrical signal produced by the radio receiving means, and said normally open contact being connected in a series connection in the ignition system circuit.

9. The starting system according to claim 1 wherein said transmitting means includes a rechargeable battery and means for recharging said batteries.

10. The starting system according to claim 9 wherein said means for recharging said battery include a receptacle for a cigarette lighter in the passenger compartment of the motor vehicle.

* * * * *